US009524093B2

(12) United States Patent
Donelan et al.

(10) Patent No.: US 9,524,093 B2
(45) Date of Patent: Dec. 20, 2016

(54) SYSTEMS AND METHODS FOR HANDLING SCROLLING ACTIONS FOR SCROLLING THROUGH CONTENT DISPLAYED ON AN ELECTRONIC DEVICE

(75) Inventors: Patrick G. Donelan, New York, NY (US); Michael Jens Schueppert, New York, NY (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 13/539,213

(22) Filed: Jun. 29, 2012

(65) Prior Publication Data

US 2015/0205475 A1   Jul. 23, 2015

(51) Int. Cl.
G09G 5/00    (2006.01)
G06F 3/0485  (2013.01)
G06F 3/0483  (2013.01)

(52) U.S. Cl.
CPC .......... G06F 3/0485 (2013.01); G06F 3/0483 (2013.01)

(58) Field of Classification Search
CPC .... G06F 3/0236; G06F 3/0485; G06F 3/0489; G06F 3/0482; G06F 17/212; G06F 17/217; G06F 2203/04101; H04M 1/274525; H04M 1/72519; B64D 11/003; A61M 5/16831; A61M 5/365; G06Q 20/123; G06T 13/80; G09B 23/288; Y02B 60/1292
USPC ....................................................... 345/684
See application file for complete search history.

(56) References Cited

U.S. PATENT DOCUMENTS

| | | | |
|---|---|---|---|
| 6,252,563 B1* | 6/2001 | Tada et al. ..................... 345/1.1 |
| 7,786,975 B2 | 8/2010 | Ording et al. | |
| 2002/0118169 A1* | 8/2002 | Hinckley et al. ............. 345/163 |
| 2006/0095862 A1* | 5/2006 | Munoz-Bustamante ..... 715/784 |
| 2006/0112351 A1 | 5/2006 | Chen | |
| 2009/0109245 A1* | 4/2009 | Han ............................. 345/684 |
| 2010/0262901 A1* | 10/2010 | DiSalvo ........................ 715/227 |
| 2010/0271342 A1* | 10/2010 | Nagashima et al. .......... 345/184 |
| 2011/0050629 A1* | 3/2011 | Homma et al. ............... 345/174 |

(Continued)

OTHER PUBLICATIONS

Palshikar, "Simple Algorithms for Peak Detection in Time-Series", Proceedings of 1st IIMA International Conference on Advanced Data Analysis, Business Analytics and Intelligence, Jun. 2009, retrieved from <http://www.tcs-trddc.com/trddc_website/scripts/srl_publications.php?primary_area=machine%20learning&lab=SRL>.

*Primary Examiner* — Gregory J Tryder
*Assistant Examiner* — Kwang Lee
(74) *Attorney, Agent, or Firm* — McDermott Will & Emery LLP

(57) ABSTRACT

Systems and methods for handling scrolling actions for scrolling through content displayed on an electronic device are provided. In some aspects, a system includes a detection module configured to detect scrolling events, each of which includes a signal to scroll in an indicated direction and by an indicated amount relative to the content displayed on the electronic device. The detection module is configured to determine whether a current one of the scrolling events is associated with a first scrolling action or a second scrolling action. The first scrolling action precedes the second scrolling action. The system also includes a scrolling module configured to suppress the current scrolling event if the current scrolling event is associated with the first scrolling action. The scrolling module is configured to scroll from a current page to a next page of the content if the current (Continued)

scrolling event is associated with the second scrolling action.

20 Claims, 10 Drawing Sheets

(56) References Cited

U.S. PATENT DOCUMENTS

| | | | |
|---|---|---|---|
| 2012/0062604 A1* | 3/2012 | Lobo et al. | 345/684 |
| 2012/0131517 A1* | 5/2012 | Yamamoto | 715/863 |
| 2012/0242570 A1* | 9/2012 | Kobayashi | 345/156 |

* cited by examiner

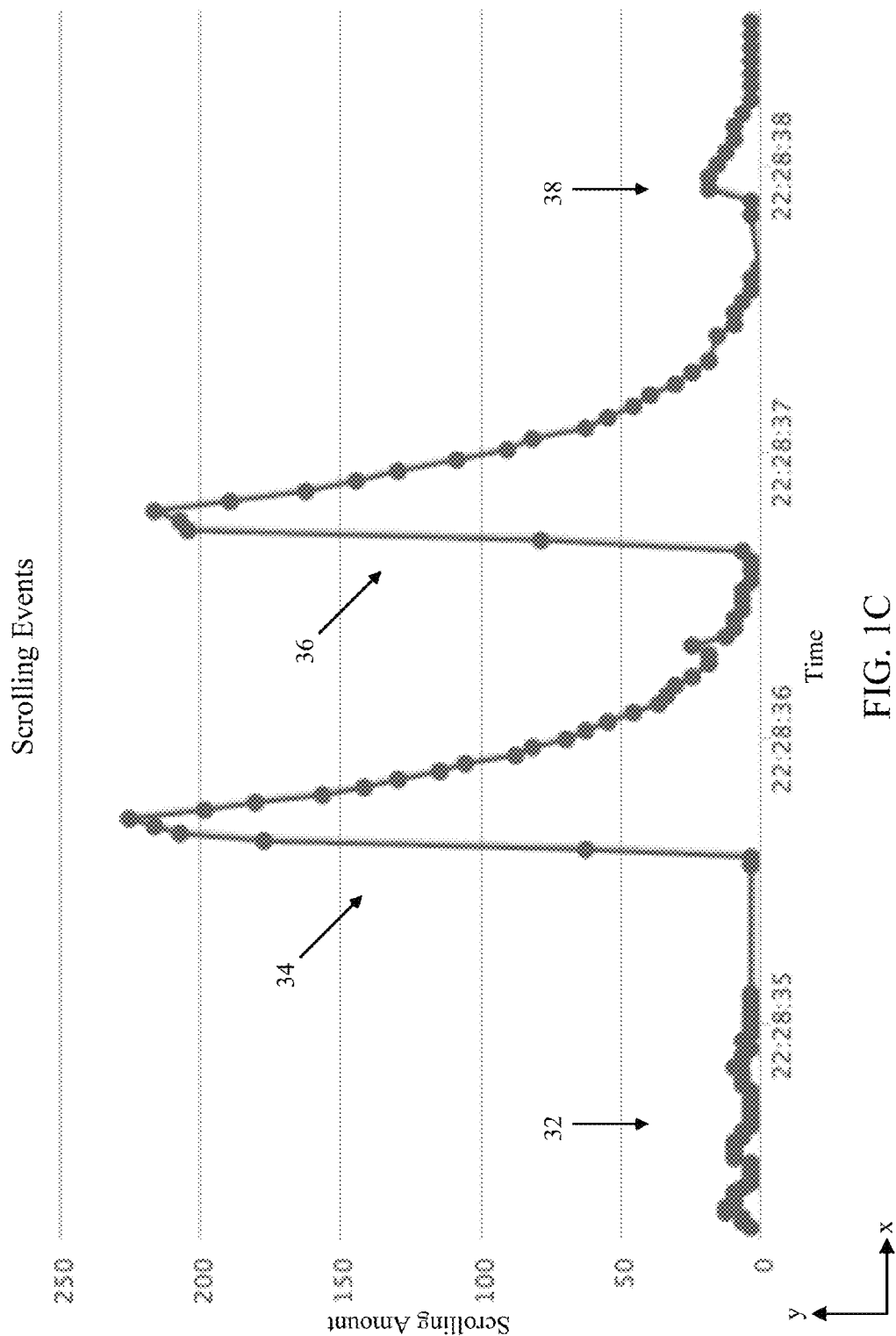

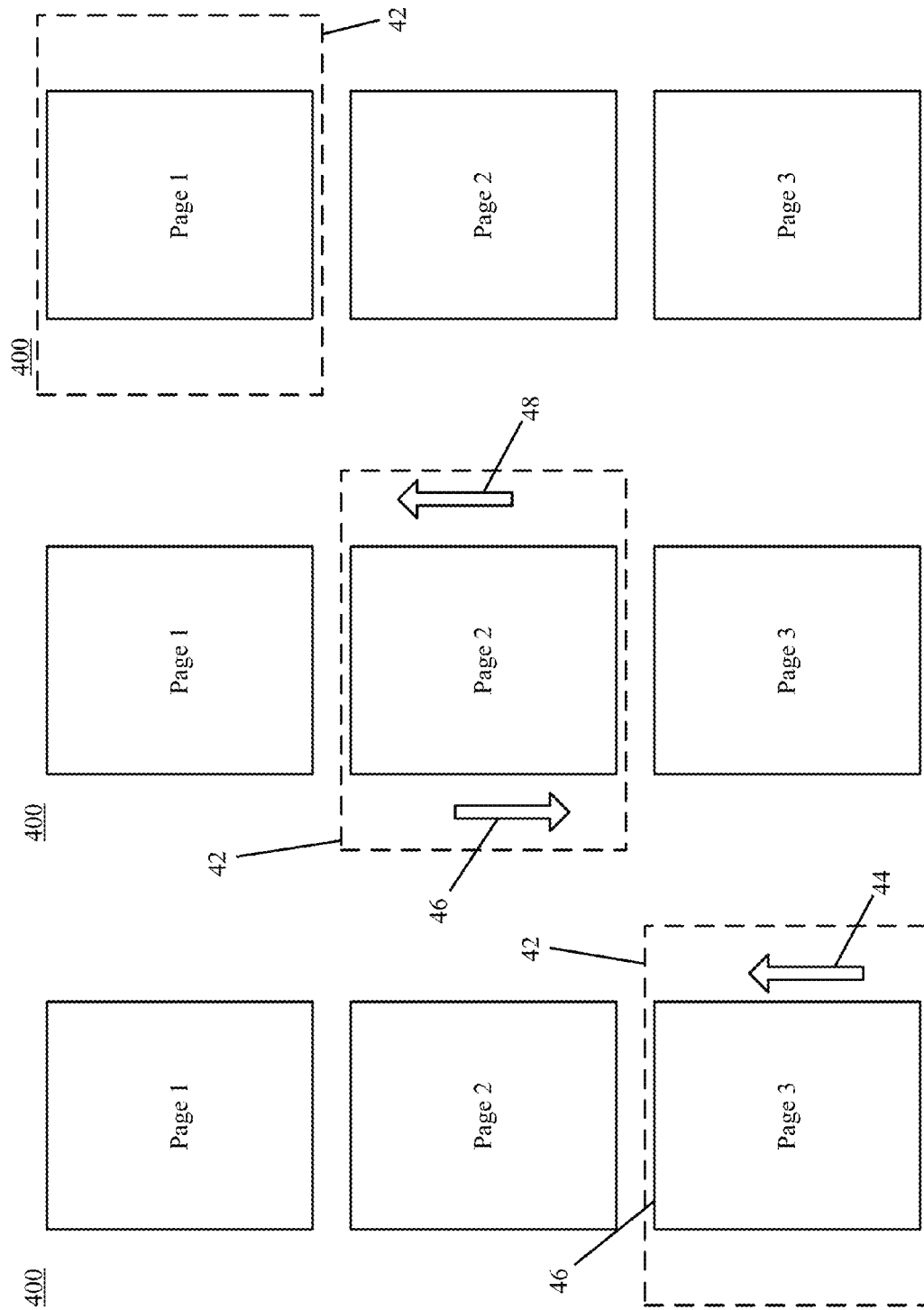

SYSTEMS AND METHODS FOR HANDLING SCROLLING ACTIONS FOR SCROLLING THROUGH CONTENT DISPLAYED ON AN ELECTRONIC DEVICE

FIELD

The subject technology generally relates to systems and methods for scrolling through content displayed on an electronic device.

BACKGROUND

A computer may be used to display slides of a presentation. A user may scroll through the presentation by using a scrolling input device, such as a mouse or a touchpad, coupled to the computer. For example, the user may perform a scrolling action, such as rotating a scroll wheel of the mouse or performing a swipe gesture on the touchpad, in order to scroll through the presentation.

SUMMARY

According to various aspects of the subject technology, a system for scrolling through content displayed on an electronic device is provided. The system comprises a detection module configured to detect scrolling events. Each of the scrolling events comprises a signal to scroll in an indicated direction and by an indicated amount relative to the content displayed on the electronic device. The system also comprises a scrolling module configured to scroll from a current page of the content to a next page of the content based on whether a time between the detection of a current one of the scrolling events and the detection of a previous one of the scrolling events exceeds a predetermined threshold.

According to various aspects of the subject technology, a computer-implemented method for scrolling through content displayed on an electronic device is provided. The method comprises detecting scrolling events sequentially. Each of the scrolling events comprises a signal to scroll in an indicated direction and by an indicated amount relative to the content displayed on the electronic device. The method also comprises scrolling from a current page of the content to a next page of the content based on whether a time between the detection of a current one of the scrolling events and the detection of a previous one of the scrolling events exceeds a predetermined threshold. The previous scrolling event immediately precedes the current scrolling event.

According to various aspects of the subject technology, a machine-readable medium encoded with executable instructions for scrolling through content displayed on an electronic device is provided. The instructions comprise code for displaying a current page of the content within a viewport of the electronic device and code for detecting scrolling events sequentially. Each of the scrolling events comprises a signal to scroll in an indicated direction and by an indicated amount relative to the content displayed on the electronic device. The instructions also comprise code for determining whether an edge of the current page is visible within the viewport and code for determining whether a direction of a current one of the scrolling events is toward the edge of the current page visible within the viewport. The instructions also comprise code for scrolling from the current page to a next page of the content based on whether the edge of the current page is visible within the viewport, whether the direction of the current scrolling event is toward the edge, and whether a time between the detection of the current scrolling event and the detection of a previous one of the scrolling events exceeds a predetermined threshold.

According to various aspects of the subject technology, a system for handling scrolling actions for scrolling through content displayed on an electronic device is provided. The system comprises a detection module configured to detect scrolling events. Each of the scrolling events comprises a signal to scroll in an indicated direction and by an indicated amount relative to the content displayed on the electronic device. The detection module is configured to determine whether a current one of the scrolling events is associated with a first scrolling action or a second scrolling action. The first scrolling action precedes the second scrolling action. The system also comprises a scrolling module configured to suppress the current scrolling event if the current scrolling event is associated with the first scrolling action. The scrolling module is configured to scroll from a current page of the content to a next page of the content if the current scrolling event is associated with the second scrolling action.

According to various aspects of the subject technology, a computer-implemented method for handling scrolling actions for scrolling through content displayed on an electronic device is provided. The method comprises detecting scrolling events. Each of the scrolling events comprises a signal to scroll in an indicated direction and by an indicated amount relative to the content displayed on the electronic device. The method also comprises determining whether a current one of the scrolling events is associated with a first scrolling action or a second scrolling action. The first scrolling action precedes the second scrolling action. The first scrolling action comprises at least one of a first rotation of a scroll wheel of a mouse or a first swipe gesture on a touchpad. The second scrolling action comprises at least one of a second rotation of the scroll wheel of the mouse or a second swipe gesture on the touchpad. The method also comprises suppressing the current scrolling event if the current scrolling event is associated with the first scrolling action. The method also comprises scrolling from a current page of the content to a next page of the content if the current scrolling event is associated with the second scrolling action.

According to various aspects of the subject technology, a machine-readable medium encoded with executable instructions for handling scrolling actions for scrolling through content displayed on an electronic device is provided. The instructions comprising code for displaying a current page of the content within a viewport of the electronic device and code for detecting scrolling events sequentially. Each of the scrolling events comprises a signal to scroll in an indicated direction and by an indicated amount relative to the content displayed on the electronic device. The instructions also comprise code for determining whether a time between the detection of a current one of the scrolling events and the detection of a previous one of the scrolling events exceeds a predetermined threshold and code for determining whether the current scrolling event is associated with a first scrolling action or a second scrolling action. The first scrolling action precedes the second scrolling action. The instructions also comprise code for suppressing the current scrolling event if the current scrolling event is associated with the first scrolling action or if the time between the detection of the current scrolling event and the detection of the previous scrolling event does not exceed the predetermined threshold. The instructions also comprise code for scrolling from the current page to a next page of the content if the current scrolling event is associated with the second scrolling action or if the time between the detection of the current scrolling event and the detection of the previous scrolling event exceeds the predetermined threshold.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 1A, 1B, 1C, and 1D are graphs illustrating examples of various profiles of scrolling events, in accordance with various aspects of the subject technology.

FIGS. 4A, 4B, and 4C illustrate examples of content that may be displayed on the electronic device, in accordance with various aspects of the subject technology.

DETAILED DESCRIPTION

Figure 1A:
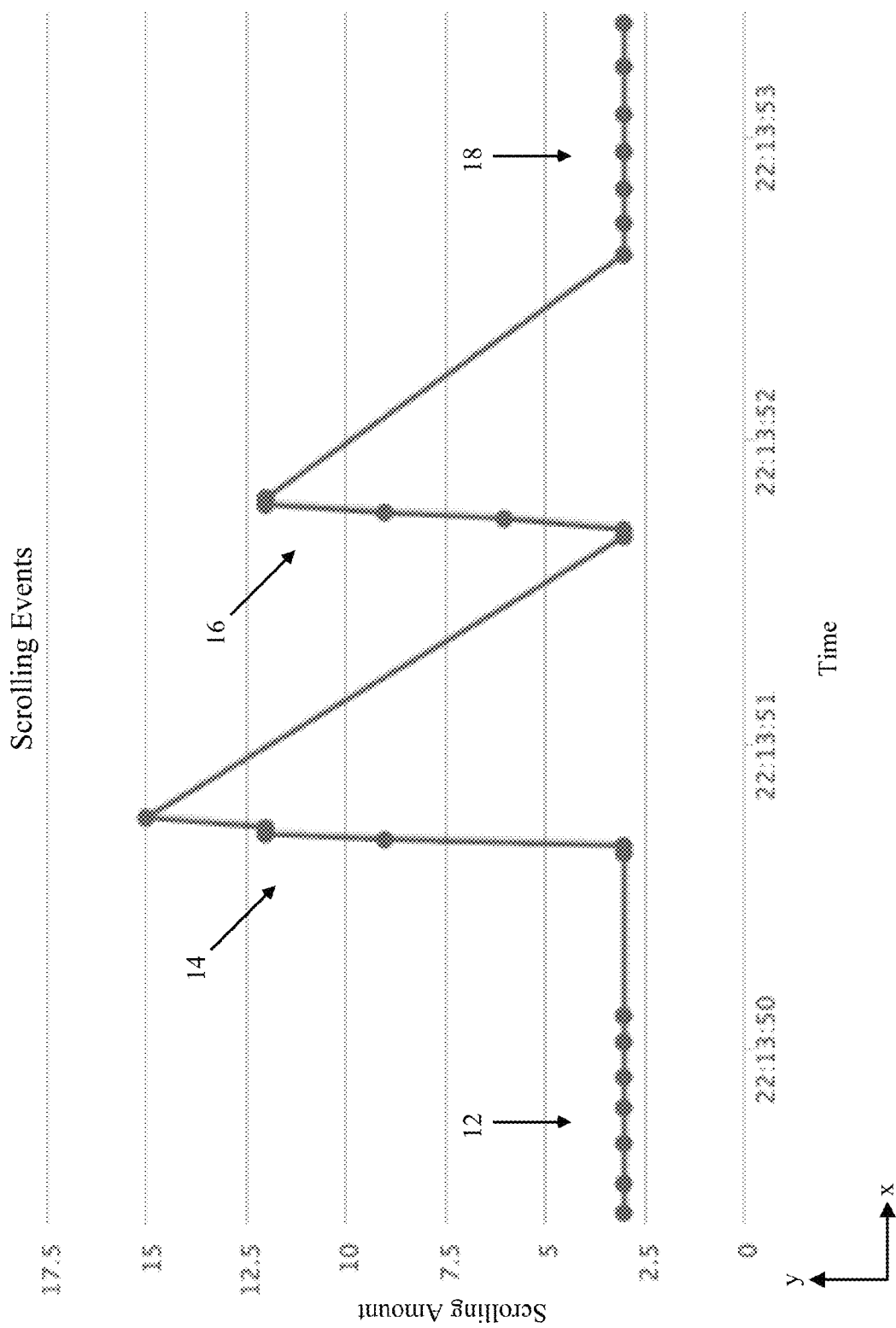

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

For a computer used to display slides of a presentation, if a current slide of the presentation does not fit within a viewport of the computer, a user may perform a scrolling action to scroll within the slide (e.g., continuous scrolling). However, scrolling beyond an edge of the current slide may trigger navigation to an adjacent slide not previously displayed (e.g., discontinuous scrolling). Thus, if the user performs a scrolling action in order to scroll to an edge of a particular slide, the same scrolling action may accidentally trigger navigation to an adjacent slide, which can be frustrating for the user.

According to various aspects of the subject technology, systems and methods are provided for scrolling through content displayed on an electronic device. The content, for example, may comprise a presentation, a calendar, a spreadsheet, a document, a webpage, and/or other content that may be displayed on the electronic device. The electronic device, for example, may comprise a desktop computer, a laptop computer, a tablet, a mobile phone, a monitor, and/or another device that may be used to display the content.

A scrolling action performed by a user may generate a plurality of scrolling events, each of which comprises a signal to scroll in an indicated direction and by an indicated amount relative to the content displayed on the electronic device. Thus, when a user performs a scrolling action to scroll to an edge of a page of the content, one or more of the scrolling events associated with the scrolling action may allow the user to intentionally scroll to the edge of the page. However, subsequent one or more scrolling events associated with the same scrolling action may accidentally trigger navigation to an adjacent page of the content. These unintentional subsequent one or more scrolling events may be referred to as tail scrolling events.

FIGS. 1A, 1B, 1C, and 1D are graphs illustrating examples of various profiles of scrolling events, in accordance with various aspects of the subject technology. Each dot displayed in the graphs represents a scrolling event generated as a result of a scrolling action performed on a scrolling input device. The time of each scrolling event is displayed along the x-axis, while the scrolling amount of each scrolling event is displayed along the y-axis. A positive value for the scrolling amount, for example, may indicate scrolling toward one direction, while a negative value for the scrolling amount may indicate scrolling toward a different direction. In general, the scrolling amount value for each scrolling event may be based on how fast a scrolling action is performed on the scrolling input device. For example, the faster the scrolling action is performed, the larger the scrolling amount value.

As discussed above, the scrolling input device may be a mouse or a touchpad. A mouse, for example, may include a scroll wheel that can rotate freely or discretely. FIG. 1A is a graph illustrating an example of a profile of scrolling events associated with a mouse with a discrete scroll wheel. With such a mouse, the scroll wheel may be rotated in a discrete manner (e.g., stepped rotation of the scroll wheel). Each stepped rotation of the scroll wheel may generate a corresponding scroll event. The graph in FIG. 1A illustrates the scrolling events when a first series of slow stepped rotations of the scroll wheel occur, followed by two series of fast stepped rotations of the scroll wheel, and then followed by a second series of slow stepped rotations of the scroll wheel. First set of scrolling events 12 corresponds to the first series of slow stepped rotations, second set of scrolling events 14 corresponds to the first series of fast stepped rotations, third set of scrolling events 16 corresponds to the second series of fast stepped rotations, and fourth set of scrolling events 18 corresponds to the second series of slow stepped rotations. As shown in FIG. 1A, the scrolling events associated with the first and second series of slow stepped rotations have the same scrolling amount value. During the two series of fast stepped rotations, the scrolling amount associated with the corresponding scrolling events grow larger in value until corresponding peaks occur, which are then followed by cut-offs in scrolling.

Figure 1B:
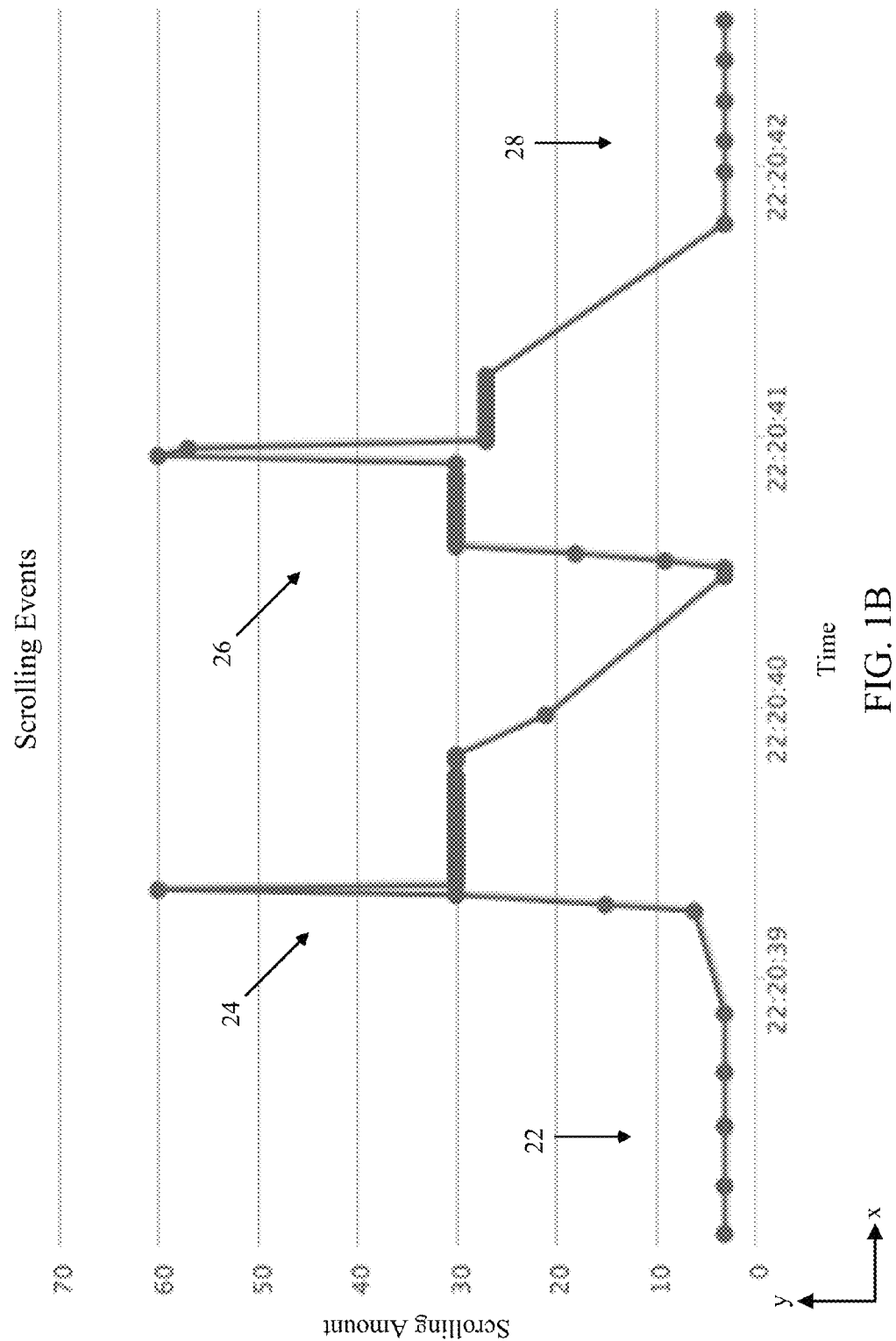

Compared to a mouse with a discrete scroll wheel, a mouse with a freely rotating scroll wheel may result in a different profile of scrolling events. The freely rotating scroll wheel may continue rotating for a much longer period of time than compared to the discrete scroll wheel. FIG. 1B is a graph illustrating an example of a profile of scrolling events associated with a mouse with a freely rotating scroll wheel. The graph in FIG. 1B illustrates the scrolling events when a first slow rotation of the freely rotating scroll wheel occurs, followed by two fast rotations of the scroll wheel, and then followed by a second slow rotation of the scroll wheel. First set of scrolling events 22 corresponds to the first slow rotation, second set of scrolling events 24 corresponds to the first fast rotation, third set of scrolling events 26 corresponds to the second fast rotation, and fourth set of scrolling events 28 corresponds to the second slow rotation. As shown in FIG. 1B, the two slow rotations of the scroll wheel generate scrolling events with substantially the same low scrolling amount value. The two fast rotations of the scroll wheel each generate scrolling events that grow larger in value until a peak occurs, followed by many scrolling events with lower scrolling amount values. Compared to the two fast rotations shown in FIG. 1A, many more scrolling events are generated before and/or after the peaks of the two fast rotations in FIG. 1B. As a result, the scrolling events associated with the two fast rotations of a freely rotating scroll wheel have a much higher probability of being tail scrolling events.

Figure 1D:
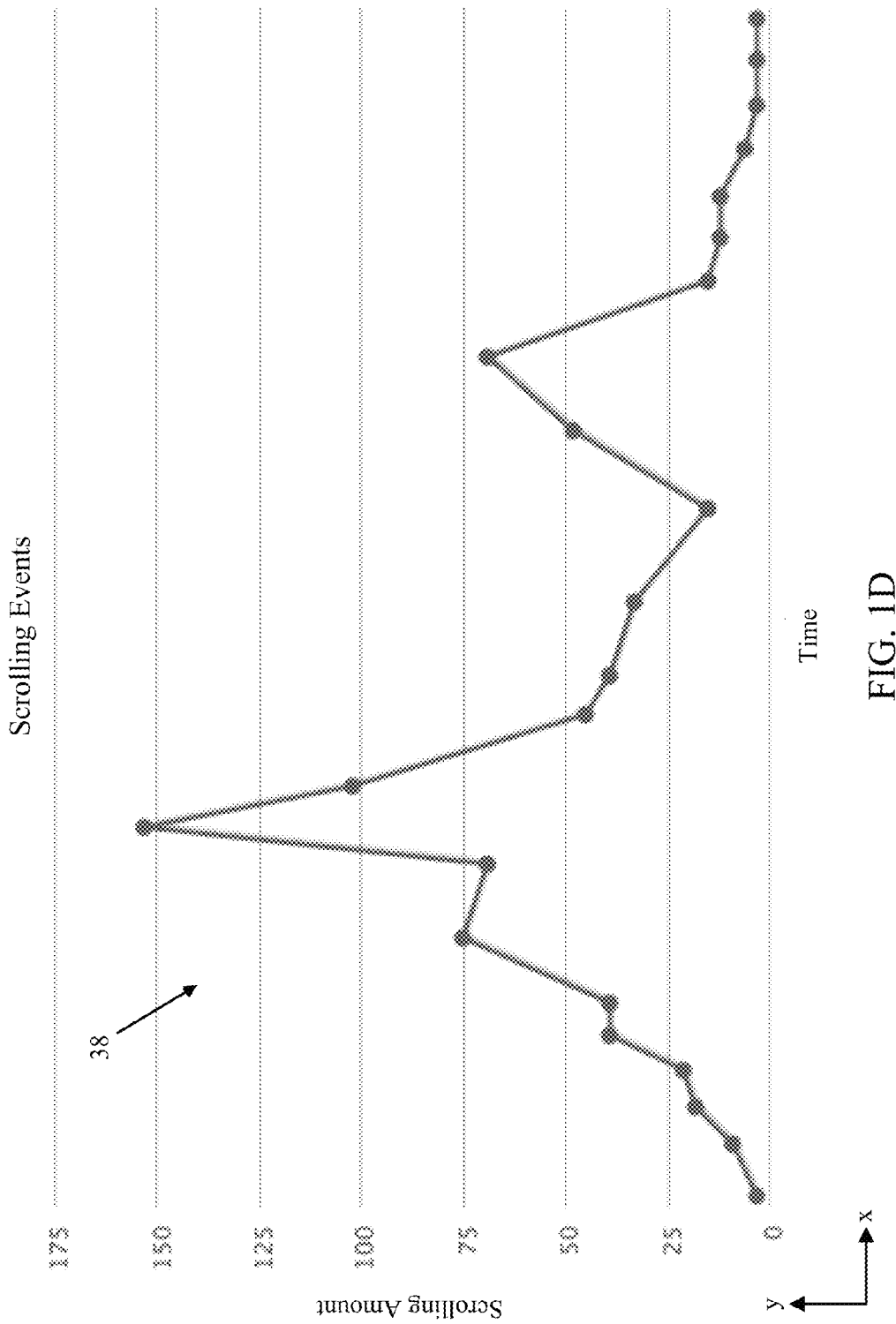

Compared to a mouse, a touchpad may result in a different profile of scrolling events. Various swipe gestures performed on the touchpad may generate scrolling events. FIG. 1C is a graph illustrating an example of a profile of scrolling events associated with a touchpad. The graph in FIG. 1C illustrates the scrolling events when a slow swipe gesture is performed, followed by two fast swipe gestures. First set of scrolling events 32 corresponds to the slow swipe gesture, second set of scrolling events 34 corresponds to the first fast swipe gesture, and third set of scrolling events 36 corresponds to the second fast swipe gesture. As shown in FIG. 1C, the swipe gestures of the touchpad produce more scrolling events than compared to a mouse, and the scrolling events produced are also generally larger in scrolling amount value than compared to the mouse. Furthermore, during the slow swipe gesture, any slight tremor in the user's motion may translate to noticeable differences in scrolling amount values, as shown by first set of scrolling events 32. A fast swipe gesture may produce scrolling events that grow larger in value until a peak occurs, followed by a long series of subsequent scrolling events, as illustrated by set of subsequent scrolling events 38 of the second fast swipe gesture. FIG. 1D illustrates set of subsequent scrolling events 38 in more detail. As shown, set of subsequent scrolling events 38 is not constant and does not necessarily monotonically decrease in value over time. As a result of the random nature of the scrolling events produced by a swipe gesture, in addition to the many scrolling events generated, the scrolling events associated with the swipe gestures may have a high probability of being tail scrolling events.

According to various aspects of the subject technology, a tail scrolling event associated with a particular scrolling action may be identified and suppressed, thereby preventing a user from accidentally navigating from a current page of the content to an adjacent page of the content. For example, since scrolling events associated with a particular scrolling action are typically generated very quickly one after another, a particular scrolling event may be assumed to be a tail scrolling event and subsequently suppressed if it is in the direction of a visible edge of the current page (between the current page and the adjacent page) and if it is generated within a predetermined time period of a previous scrolling event. Thus, the predetermined time period may be used in this manner as a throttling threshold.

By suppressing tail scrolling events of a scrolling action, the user may be allowed to vigorously perform the scrolling action to scroll to the edge of the current page without accidentally triggering navigation to the adjacent page. Should the user desire to navigate to the adjacent page, the user may perform a new scrolling action after a short pause (e.g., a time greater than the throttling threshold) so that a scrolling event associated with the new scrolling action may trigger the navigation to the adjacent page.

Figure 2:
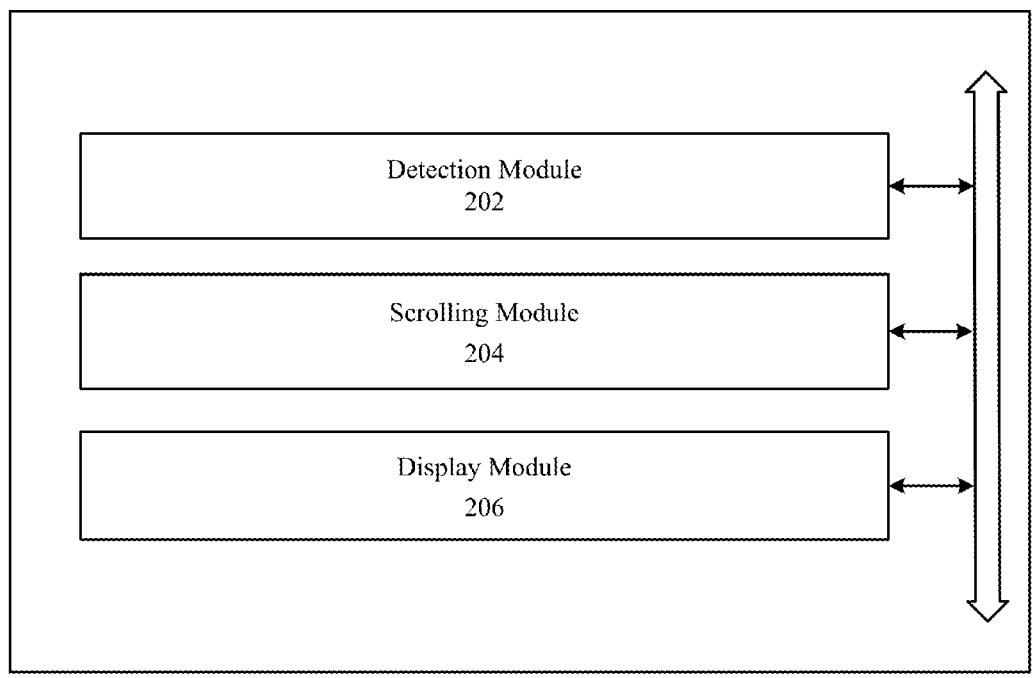
FIG. 2 illustrates an example of a system for scrolling through content displayed on an electronic device, in accordance with various aspects of the subject technology.

FIG. 2 illustrates an example of system 200 for scrolling through content displayed on an electronic device, in accordance with various aspects of the subject technology. System 200, for example, may be part of the electronic device. System 200 comprises detection module 202, scrolling module 204, and display module 206. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
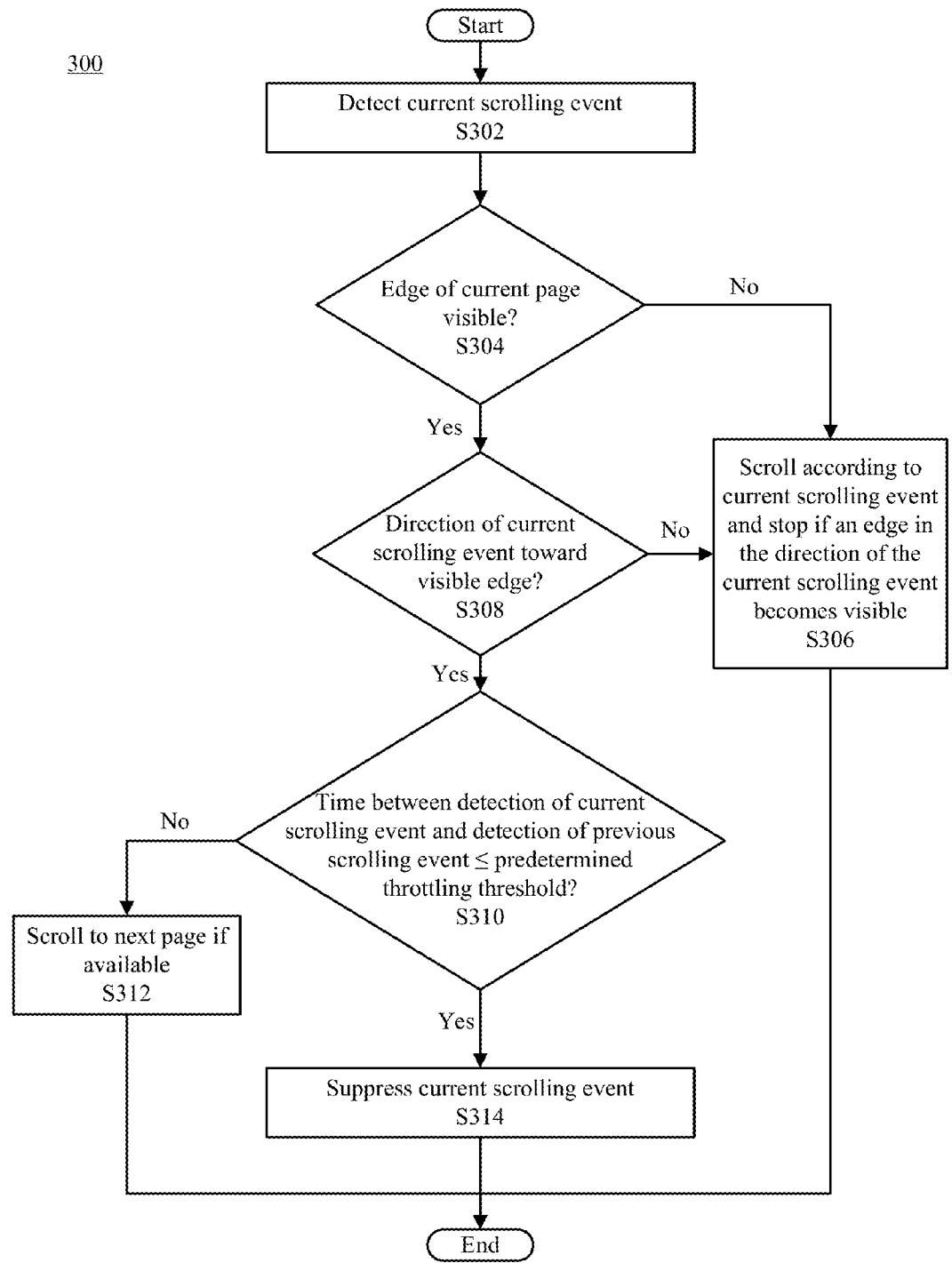
FIG. 3 illustrates an example of a method for scrolling through content displayed on an electronic device, in accordance with various aspects of the subject technology.

FIG. 3 illustrates an example of method 300 for scrolling through content displayed on an electronic device, in accordance with various aspects of the subject technology. Method 300, for example, may be implemented by system 200. However, method 300 may also be implemented by other systems having different configurations. FIGS. 4A, 4B, and 4C illustrate examples of content 400 that may be displayed on the electronic device, in accordance with various aspects of the subject technology. Method 300 may be implemented with respect to the examples shown in FIGS. 4A, 4B, and 4C. However, method 300 may also be implemented with respect to other scenarios in which the content, the scrolling, what is displayed, and/or other features may be different. As shown in FIGS. 4A, 4B, and 4C, content 400 comprises three pages (e.g., page 1, page 2, and page 3). Each of these pages may be displayed within viewport 42 of the electronic device. As discussed above, content 400 may comprise a presentation, a calendar, a spreadsheet, a document, a webpage, and/or other content that may be displayed on the electronic device.

Referring to FIGS. 2, 3, 4A, 4B, and 4C, system 200 may implement method 300 to allow a user to scroll through content 400 by performing one or more scrolling actions with respect to a scrolling input device. Display module 206 may display content 400 within viewport 42. In some aspects, display module 206 may display a single page of content 400 within viewport 42 at a time. Thus, a scrolling action performed by the user may allow the user to scroll within the page currently displayed and/or to trigger navigation to a different page not currently displayed. In this regard, method 300 may be implemented to determine if a given scrolling event associated with the scrolling action should be used (either to scroll within the page currently displayed and/or scroll to a next page) or be suppressed (to prevent accidental navigation to a next page).

According to step S302, detection module 202 may detect a current one of the scrolling events associated with the scrolling action. This current scrolling event may be the latest one of the scrolling events to be detected. According to step S304, detection module 202 may determine whether an edge of a current page is visible within viewport 42.

According to steps S304 and S306, if the edge is not visible, then the current page may be scrolled through according to the current scrolling event, and the scrolling may be suspended if an edge in the direction of the current scrolling event becomes visible. However, in the example shown in FIG. 4A, the current page displayed within viewport 42 is page 3, and the edges of this page are visible, particularly edge 46. In this regard, according to steps S304 and S308, if the edges of the current page are visible, detection module 202 may determine whether a direction of the current scrolling event is toward the edge that is visible within viewport 42.

According to steps S308 and S306, if the direction of the current scrolling event is not toward the edge that is visible within viewport 42, then the current page may be scrolled through according to the current scrolling event, and the scrolling may be suspended if an edge in the direction of the current scrolling event becomes visible. However, in the example shown in FIG. 4A, the direction of the current scrolling event is indicated by arrow 44, which is toward the visible edge 46. Thus, method 300 may proceed to step S310.

According to step S310, detection module 202 may determine a time between the detection of the current scrolling event and the detection of a previous one of the scrolling events. In some aspects, the previous scrolling event may immediately precede the current scrolling event. In some aspects, the previous scrolling event may be the last one of the scrolling events used to scroll to an edge of the current page. Detection module 202 may compare the time between the detection of the current scrolling event and the detection of the previous scrolling event to a predetermined throttling threshold.

As discussed above, since scrolling events associated with a particular scrolling action are typically generated very quickly one after another, a particular scrolling event may be suppressed if it is in the direction of the visible edge of the current page (between the current page and the next page) and if it is generated within a predetermined time period of a previous scrolling event. This predetermined time period may be used as the predetermined throttling threshold. The predetermined throttling threshold, in essence, establishes a time period for how long the user may pause before the user can scroll to the next page (if an edge of a current page is reached from a previous scrolling event). According to certain aspects, the predetermined throttling threshold may be set such that it is not too high (where the user may need to inconveniently wait too long before being able to scroll again) and not too low (where any subsequent tail scrolling event that is quickly generated after the previous scrolling event may trigger accidental navigation to the next page). For example, the predetermined throttling threshold may be between 100 milliseconds and 150 milliseconds. However, the predetermined throttling threshold may be greater than or lower than this range depending on the type of scrolling input device involved, user preference, the type of electronic device, etc.

If the time between the detection of the current scrolling event and the detection of the previous scrolling event exceeds the predetermined throttling threshold, then according to step S312, scrolling module 204 may scroll from the current page of the content to the next page of the content (if the next page is available). For example, as shown in FIGS. 4A and 4B, scrolling module 204 may scroll from page 3 to page 2. In response to the scrolling, display module 206 may display page 2 within viewport 42. If, on the other hand, the time between the detection of the current scrolling event and the detection of the previous scrolling event does not exceed the predetermined throttling threshold, then according to step S314, scrolling module 204 may suppress the current scrolling event. Thus, in the example shown in FIGS. 4A and 4B, scrolling module 204 does not scroll from page 3 to page 2. Rather, the current scrolling event, in the direction of arrow 44, is suppressed. Therefore, page 3 remains displayed within viewport 42.

One difficulty with implementing the predetermined throttling threshold is that a scrolling action, such as a fast rotation of a scroll wheel of a mouse or a swiping gesture on a touchpad, may generate a barrage of tail scrolling events that last several seconds. Thus, while the predetermined throttling threshold may be used to suppress these tail scrolling events, new scrolling events associated with a new scrolling action by the user may also be undesirably suppressed during that time. According to various aspects of the subject technology, the tail scrolling events associated with the old scrolling action may be distinguished from the new scrolling events associated with the new scrolling action so that the new scrolling events may be used to scroll through content while the tail scrolling events are suppressed. For example, the tail scrolling events are typically in the same direction as one another. Thus, if a particular scrolling event is in a different direction than the tail scrolling events, then this particular scrolling event may be assumed to be associated with the new scrolling action. Furthermore, various signal detection methods, such as keeping track of a cumulative moving average of a sample of detected scrolling events, may be employed to determine whether a particular scrolling event is associated with the old scrolling action or the new scrolling action.

Figure 5A:
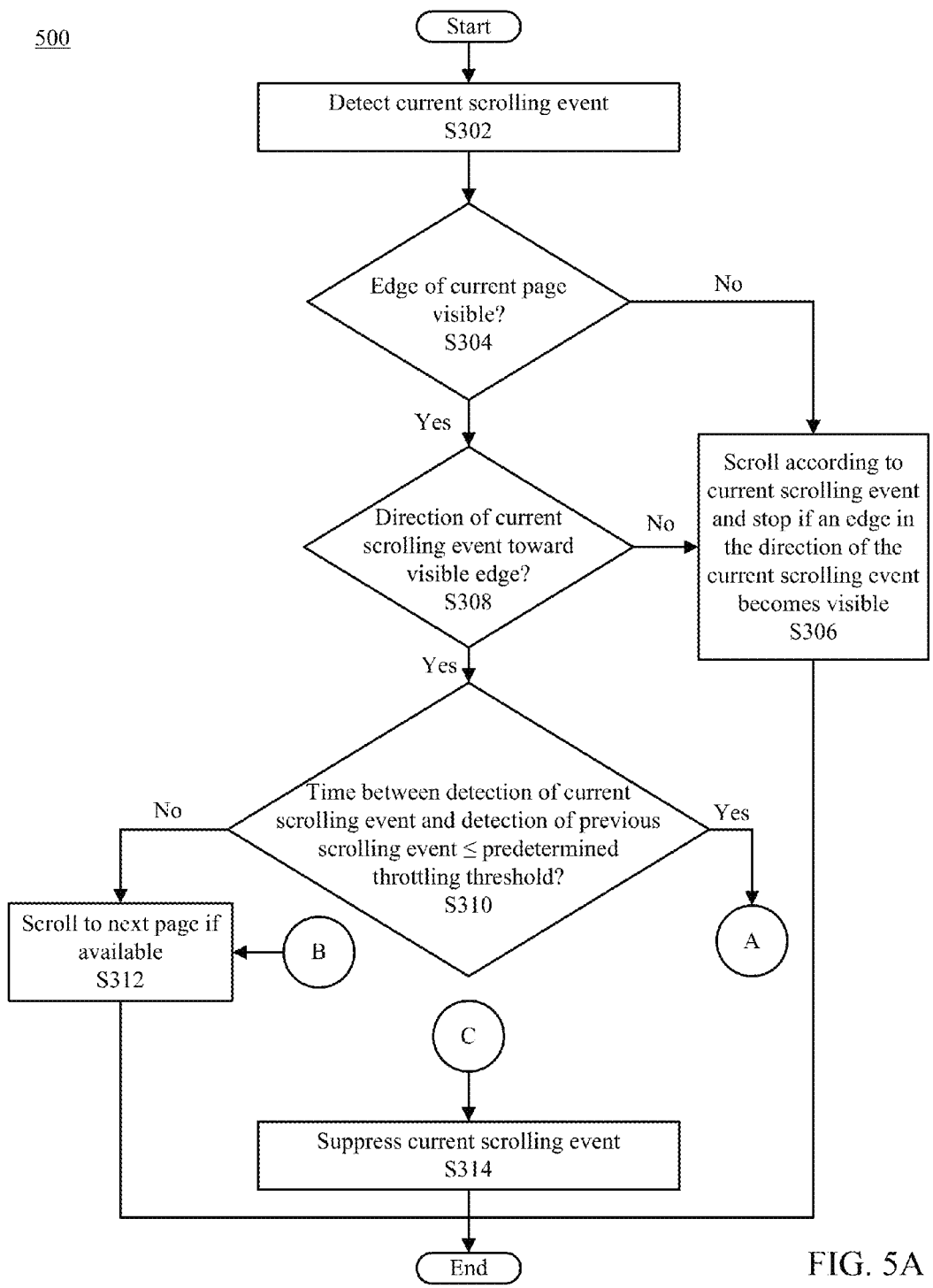
FIGS. 5A and 5B illustrate an example of a method for handling scrolling actions for scrolling through content displayed on an electronic device, in accordance with various aspects of the subject technology.
Figure 5B:
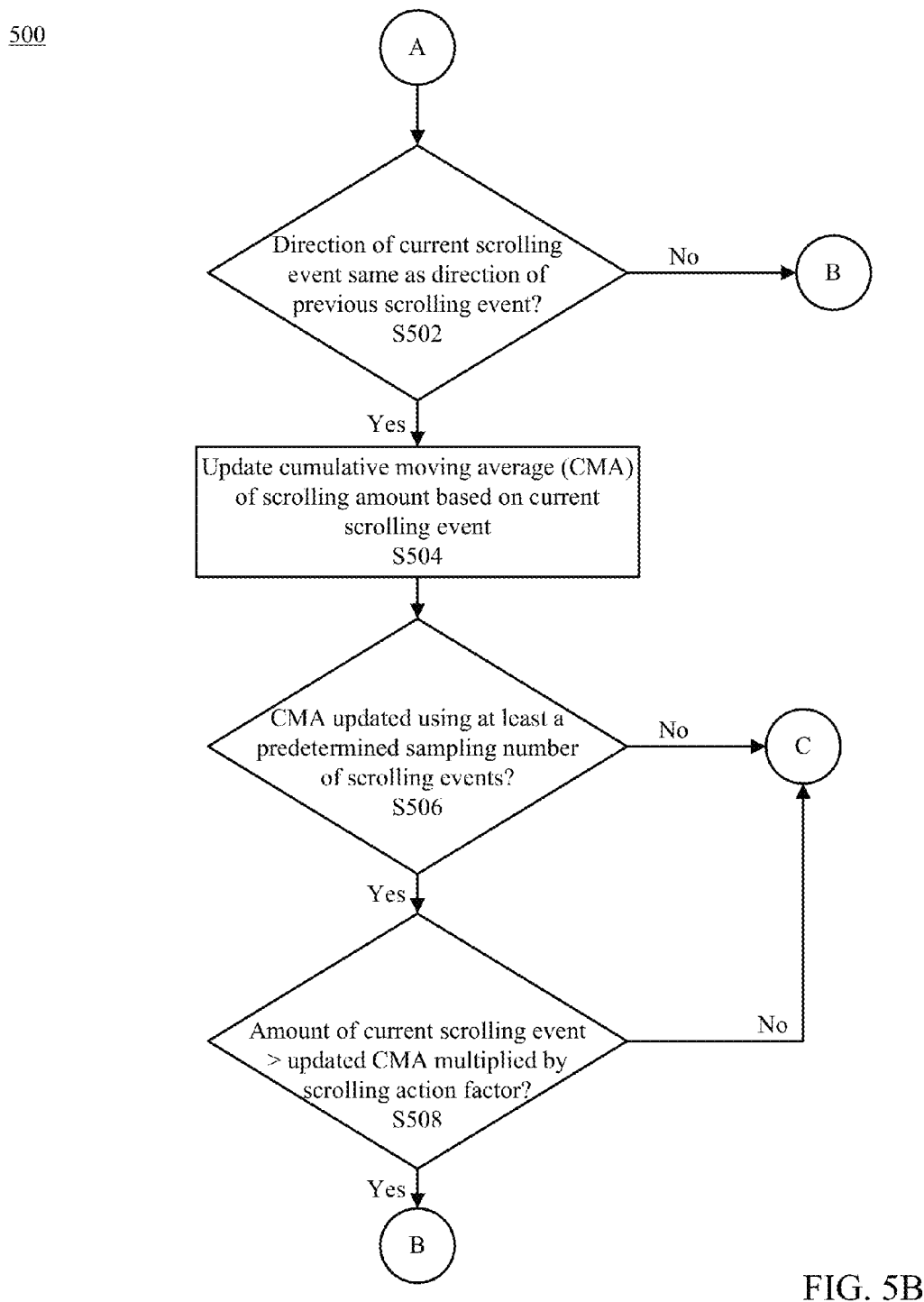

FIGS. 5A and 5B illustrate an example of method 500 for handling scrolling actions for scrolling through content displayed on an electronic device, in accordance with various aspects of the subject technology. Method 500, for example, may be implemented to determine whether a current scrolling event is associated with a first scrolling action or a second scrolling action performed after the first scrolling action. The first scrolling action or the second scrolling action, for example, may be a rotation of a scroll wheel of a mouse and/or a swipe gesture on a touchpad. Because the first scrolling action and the second scrolling action may each be associated with respective scrolling events, any scrolling event detected between these two actions may be confused with either being a tail scrolling event of the first scrolling action or a new scrolling event of the second scrolling action. In this regard, if the current scrolling event is associated with the first scrolling action, then the current scrolling event may be assumed to be a tail scrolling event, and subsequently suppressed. If the current scrolling event is associated with the second scrolling action, then the current scrolling event may be assumed to be intended by the user, and content 400 may be scrolled according to the current scrolling event (e.g., scrolling to a next page of content 400). In some aspects, method 500 may be implemented by system 200. However, method 500 may also be implemented by other systems having different configurations.

According to certain aspects, method 500 comprises the same steps as method 300 (e.g., steps S302, S304, S306, S308, S310, S312, and S314), but comprises additional steps between step S310 and S314. For example, if detection module 202 determines in step S310 that the time between the detection of current scrolling event and the detection of the previous scrolling event does not exceed the predetermined throttling threshold, instead of immediately suppressing the current scrolling event as before in method 300, method 500 proceeds to step S502 in FIG. 5B. According to step S502, detection module 202 may determine if the direction of the current scrolling event is the same as a direction of the previous scrolling event. If not, scrolling module 204 may determine that the current scrolling event is associated with the second scrolling action. This is because the directions of the scrolling events associated with the first scrolling action are in the same direction. Thus, if the direction of the current scrolling event is not the same as the direction of the previous scrolling event, it is likely that the current scrolling event is associated with the second scrolling action. In this regard, method 500 may proceed to step S312, and scrolling module 204 may scroll to the next page if it is available. For example, as shown in FIGS. 4A and 4B, the direction of the first scrolling action (and consequently its associated scrolling events) may be represented by arrow 44, while the direction of the second scrolling action (and consequently its associated scrolling events) may be represented by arrow 46. Thus, using method 500, the user may scroll back and forth between page 3 and page 2 even though the time between the detection of the current scrolling event and the detection of the previous scrolling event does not exceed the predetermined throttling threshold. In other words, the user may be allowed to scroll back and forth between pages of content 400 without having to wait for the pause established by the predetermined throttling threshold.

According to certain aspects, method 500 may also allow the user to scroll with the second scrolling action in the same direction as the first scrolling action (instead of back and forth between pages of content 400) without having to wait for the pause established by the predetermined throttling threshold. For example, as shown in FIGS. 4A, 4B, and 4C, the direction of the first scrolling action may be represented by arrow 44, and the direction of the second scrolling action may be represented by arrow 48. Thus, in this example, the user's two scrolling actions indicate a desire to scroll from page 3 to page 2, and then from page 2 to page 1. Method 500 may be implemented in this situation to allow the user to scroll from page 2 to page 1 (based on a current scrolling event detected after scrolling to page 2) without having to wait for the pause established by the predetermined throttling threshold.

Various signal detection methods may be applied to determine if the current scrolling event is associated with the second scrolling action. That is, the signal detection methods may be used to analyze a sample of the detected scrolling events to determine whether the current scrolling event is associated with the second scrolling action. For example, in FIGS. 1A, 1B, and 1C, it can be seen that the two fast scrolling actions performed by a user may each generate a signal comprised of scrolling events that form a respective peak. Signal detection methods may be applied to determine whether the current scrolling event is associated with the signal of the second scrolling action or the signal of the first scrolling action. An example of such a signal detection method is a cumulative moving average (CMA) technique. However, other suitable signal detection methods may be applied as well, including, but not limited to, curve fitting techniques, wave-packet energy analysis techniques, and other suitable techniques.

Using the CMA technique, a CMA of a scrolling amount of a sample of the scrolling events (detected at an end portion of the first scrolling action, between the first scrolling action and the second scrolling action, or at a beginning portion of the second scrolling action) may be maintained in order to determine whether the current scrolling event is associated with the first scrolling action or the second scrolling action. Because each scrolling action is typically associated with a peak, it can be assumed that if an amount of the current scrolling event is close to the peak of the second scrolling action relative to the CMA, then the current scrolling event is more likely to be associated with the second scrolling action than to be a tail scrolling event associated with the first scrolling action. In this regard, if the direction of the current scrolling event is the same as the direction of the previous scrolling event, then according to step S504, detection module 202 may update the CMA of the scrolling amount of the sample of the scrolling events based on the current scrolling event. In particular, detection module 202 may update the CMA using the scrolling amount associated with the current scrolling event.

Because the scrolling amounts of the sample of the scrolling events may fluctuate, it may be desirable to use at least a predetermined sampling number of scrolling events to obtain a more accurate average. In this regard, according to step S506, detection module 202 may determine if the sample of the scrolling events is greater than or equal to the predetermined sampling number of scrolling events. In some aspects, the predetermined sampling number of scrolling events may be between 20 and 80, which may provide a fairly accurate average. However, other sampling numbers greater than or less than this range may be used depending on the accuracy of the detection of the scrolling events, the type of scrolling input device, the type of electronic device, etc.

According to step S506, if detection module 202 determines that the CMA is updated using scrolling events less than or equal to the predetermined sampling number of scrolling events, then the CMA may not be accurate enough. In this regard, detection module 202 may assume that the current scrolling event is associated with the first scrolling action, and therefore, method 500 may proceed to S314. That is, scrolling module 204 may suppress the current scrolling event. In the example shown in FIGS. 4A, 4B, and 4C, while the user may scroll from page 3 to page 2, the user cannot scroll from page 2 to page 1 because the current scrolling event is suppressed.

On the other hand, if detection module 202 determines that the CMA is updated using scrolling events that exceed the predetermined sampling number of scrolling events, then method 500 may proceed in determining whether the current scrolling event is associated with the second scrolling action by analyzing whether the scrolling amount of the current scrolling event is close to the peak of the second scrolling action. For example, the scrolling amount of the current scrolling event may be compared to the CMA. If the scrolling amount of the current scrolling event is much larger than the CMA, then it can be assumed that the current scrolling event is close to the peak of the second scrolling action, and therefore is associated with the second scrolling action. In this regard, according to step S508, detection module 202 may determine if the scrolling amount of the current scrolling event is greater than the CMA multiplied by a scrolling action factor. The scrolling action factor, which may also be referred to as a peak factor, may be used to determine how much larger the scrolling amount of the current scrolling event may be before the current scrolling event is considered to be associated with the second scrolling action. For example, the scrolling action factor may be between 1.1 and 1.5. However, the scrolling action factor may be greater than or less than this range depending on the amount of noise present when detecting the scrolling events, the type of scrolling input device, the type of electronic device, etc.

According to certain aspects, scrolling module 204 may determine that the current scrolling event is associated with the second scrolling action if the amount of the current scrolling event is greater than the CMA multiplied by the scrolling action factor. In this case, according to steps S508 and S312, scrolling module 204 may scroll to the next page if it is available. For example, as shown in FIGS. 4B and 4C, detection module 202 may determine that the current scrolling event, as represented by arrow 48, is part of the second scrolling action. Therefore, scrolling module 204 may scroll from page 2 in FIG. 4B to page 1 in FIG. 4C. Display module 206 may display page 3 within viewport 42 in response to this scrolling.

On the other hand, scrolling module 204 may determine that the current scrolling event is associated with the first scrolling action if the amount of the current scrolling event is not greater than the CMA multiplied by the scrolling action factor. In this case, according to steps S508 and S314, scrolling module 204 may suppress the current scrolling event. Thus, in the example shown in FIGS. 4B and 4C, scrolling module 204 does not scroll from page 2 to page 1. Rather, the current scrolling event, in the direction of arrow 48, is suppressed, and page 2 remains displayed within viewport 42.

Figure 6:
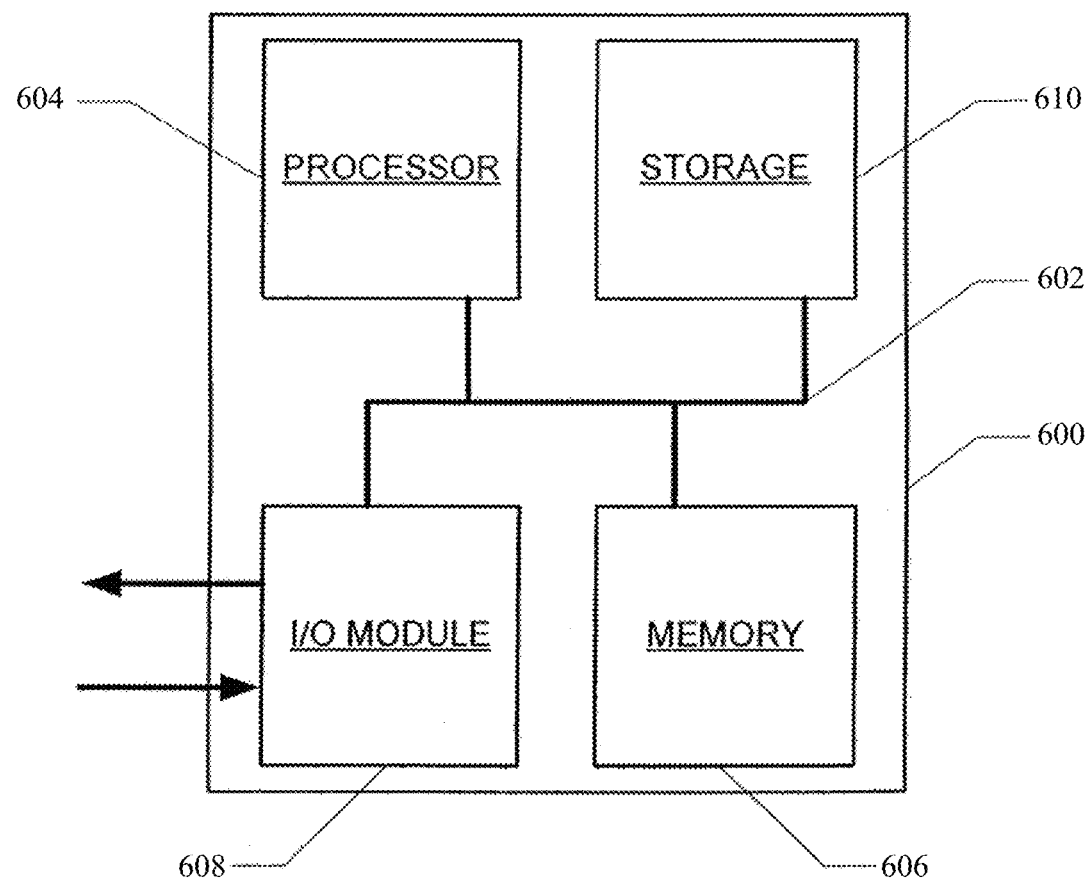
FIG. 6 is a block diagram illustrating components of a controller, in accordance with various aspects of the subject technology.

FIG. 6 is a block diagram illustrating components of controller 600, in accordance with various aspects of the subject technology. Controller 600 comprises processor module 604, storage module 610, input/output (I/O) module 608, memory module 606, and bus 602. Bus 602 may be any suitable communication mechanism for communicating information. Processor module 604, storage module 610, I/O module 608, and memory module 606 are coupled with bus 602 for communicating information between any of the modules of controller 600 and/or information between any module of controller 600 and a device external to controller 600. For example, information communicated between any of the modules of controller 600 may include instructions and/or data. In some aspects, bus 602 may be a universal serial bus. In some aspects, bus 602 may provide Ethernet connectivity.

In some aspects, processor module 604 may comprise one or more processors, where each processor may perform different functions or execute different instructions and/or processes. For example, one or more processors may execute instructions for operating system 200, one or more processors may execute instructions for scrolling through content displayed on an electronic device (e.g., method 300) and/or for handling scrolling actions for scrolling through content displayed on an electronic device (e.g., method 500), and one or more processors may execute instructions for input/output functions.

Memory module 606 may be random access memory ("RAM") or other dynamic storage devices for storing information and instructions to be executed by processor module 604. Memory module 606 may also be used for storing temporary variables or other intermediate information during execution of instructions by processor 604. In some aspects, memory module 606 may comprise battery-powered static RAM, which stores information without requiring power to maintain the stored information. Storage module 610 may be a magnetic disk or optical disk and may also store information and instructions. In some aspects, storage module 610 may comprise hard disk storage or electronic memory storage (e.g., flash memory). In some aspects, memory module 606 and storage module 610 are both a machine-readable medium.

Controller 600 is coupled via I/O module 608 to a user interface for providing information to and receiving information from an operator of system 200. For example, the user interface may be a cathode ray tube ("CRT") or LCD monitor for displaying information to an operator. The user interface may also include, for example, a keyboard or a mouse coupled to controller 600 via I/O module 608 for communicating information and command selections to processor module 604.

According to various aspects of the subject technology, methods described herein are executed by controller 600. Specifically, processor module 604 executes one or more sequences of instructions contained in memory module 606 and/or storage module 610. In one example, instructions may be read into memory module 606 from another machine-readable medium, such as storage module 610. In another example, instructions may be read directly into memory module 606 from I/O module 608, for example from an operator of system 200 via the user interface. Execution of the sequences of instructions contained in memory module 606 and/or storage module 610 causes processor module 604 to perform methods to scroll through content displayed on an electronic device and/or methods to handle scrolling actions for scrolling through content displayed on an electronic device. For example, a computational algorithm for implementing these methods may be stored in memory module 606 and/or storage module 610 as one or more sequences of instructions. Information such as the scrolling events, the content, the predetermined throttling threshold, the CMA, the predetermined sampling number of scrolling events, the scrolling action factor, and/or other suitable information may be communicated from processor module 604 to memory module 606 and/or storage module 610 via bus 602 for storage. In some aspects, the information may be communicated from processor module 604, memory module 606, and/or storage module 610 to I/O module 608 via bus 602. The information may then be communicated from I/O module 608 to an operator of system 200 via the user interface.

One or more processors in a multi-processing arrangement may also be employed to execute the sequences of instructions contained in memory module 606 and/or storage module 610. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 604 for execution. Such a medium may take many forms, including, but not limited to, non-volatile media and volatile media. Non-volatile media include, for example, optical or magnetic disks, such as storage module 610. Volatile media include dynamic memory, such as memory module 606. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A system for handling scrolling actions for scrolling through content displayed on an electronic device, the system comprising:
   one or more processors; and
   a machine-readable medium comprising instructions stored therein, which when executed by the processors, cause the processors to perform operations comprising:
      detecting scrolling events, each of the scrolling events comprising a signal to scroll in an indicated direction and by an indicated amount relative to the content displayed on the electronic device;
      determining, from the detected scrolling events, a first peak scrolling amount of a first scrolling action, the first scrolling action associated with a first plurality of scrolling events;
      determining whether a current scrolling event of the detected scrolling events is associated with a tail scrolling event of the first scrolling action or a second scrolling action based at least on a scrolling amount of the current scrolling event and the first peak scrolling amount, the first scrolling action preceding the second scrolling action, the second scrolling action associated with a second plurality of scrolling events;
      suppressing the current scrolling event if an edge of a current page of the content is visible, the current scrolling event is generated within a predetermined time period of a previous scrolling event, and the current scrolling event is associated with the tail scrolling event of the first scrolling action to prevent scrolling from the current page of the content to a next page of the content,
   wherein the one or more processors are configured to scroll from the current page of the content to the next page of the content if the current scrolling event is associated with the second scrolling action, if an edge of the current page is visible from the first scrolling action, and if the indicated direction of the second scrolling action is towards the visible edge.

2. The system of claim 1, wherein the first scrolling action comprises at least one of a first rotation of a scroll wheel of a mouse or a first swipe gesture on a touchpad, and wherein the second scrolling action comprises at least one of a second rotation of the scroll wheel of the mouse or a second swipe gesture on the touchpad.

3. The system of claim 1, wherein the operations further comprise determining if a direction of the current scrolling event is the same as a direction of a previous one of the scrolling events.

4. The system of claim 3, wherein the previous scrolling event is associated with the first scrolling action.

5. The system of claim 3, wherein the operations further comprise determining that the current scrolling event is associated with the second scrolling action if the direction of the current scrolling event is not the same as the direction of the previous scrolling event.

6. The system of claim 3, wherein, if the direction of the current scrolling event is the same as the direction of the previous scrolling event, the operations further comprise updating a cumulative moving average (CMA) of an amount of scrolling associated with a set of the scrolling events based on the current scrolling event, the set of the scrolling events associated with scrolling events after the first peak of the first scrolling event.

7. The system of claim 6, wherein the set of the scrolling events are detected at an end portion of the first scrolling action, between the first scrolling action and the second scrolling action, or at a beginning portion of the second scrolling action.

8. The system of claim 6, wherein the operations further comprise determining if the set of the scrolling events is greater than or equal to a predetermined sampling number of scrolling events.

9. The system of claim 8, wherein the predetermined sampling number of scrolling events is between 20 and 80.

10. The system of claim 8, wherein the operations further comprise determining that the current scrolling event is associated with the first scrolling action if the set of the scrolling events is not greater than or equal to the predetermined sampling number of scrolling events and if the direction of the current scrolling event is the same as the direction of the previous scrolling event.

11. The system of claim 8, wherein, if the set of the scrolling events is greater than or equal to the predetermined sampling number of scrolling events, the operations further comprise determining if an amount of the current scrolling event is greater than the CMA multiplied by a scrolling action factor.

12. The system of claim 11, wherein the scrolling action factor is between 1.1 and 1.5.

13. The system of claim 11, wherein the operations further comprise determining that the current scrolling event is associated with the second scrolling action if the amount of the current scrolling event is greater than the CMA multiplied by the scrolling action factor, if the set of the scrolling events is greater than or equal to the predetermined sampling number of scrolling events, and if the direction of the current scrolling event is the same as the direction of the previous scrolling event.

14. The system of claim 11, wherein the operations further comprise determining that the current scrolling event is associated with the first scrolling action if the amount of the current scrolling event is not greater than the CMA multiplied by the scrolling action factor, if the set of scrolling events is greater than or equal to the predetermined sampling number of scrolling events, and if the direction of the current scrolling event is the same as the direction of the previous scrolling event.

15. A computer-implemented method for handling scrolling actions for scrolling through content displayed on an electronic device, the method comprising:
 detecting scrolling events, each of the scrolling events comprising a signal to scroll in an indicated direction and by an indicated amount relative to the content displayed on the electronic device;
 determining, from the detected scrolling events, a first peak scrolling amount of a first scrolling action, the first scrolling action associated with a first plurality of scrolling events comprising at least one of a first rotation of a scroll wheel of a mouse or a first wipe gesture on a touchpad;
 determining whether a current scrolling event of the detected scrolling events is associated with a tail scrolling event of the first scrolling action or a second scrolling action based at least on the first peak scrolling amount, the first scrolling action preceding the second scrolling action, the second scrolling action comprising at least one of a second rotation of the scroll wheel of the mouse or a second swipe gesture on the touchpad and associated with a second plurality of scrolling events;
 suppressing the current scrolling event if an edge of a current page of the content is visible, the current scrolling event is generated within a predetermined time period of a previous scrolling event, and the current scrolling event is associated with the tail scrolling event of the first scrolling action to prevent scrolling from the current page of the content to a next page of the content; and
 scrolling from the current page of the content to the next page of the content if the current scrolling event is associated with the second scrolling action, if the edge of the current page is visible from the first scrolling action, and if the indicated direction of the second scrolling action is towards the visible edge.

16. The method of claim 15, wherein determining whether the current scrolling event is associated with the first scrolling action or the second scrolling action is based on a cumulative moving average (CMA) of an amount of scrolling associated with at least a predetermined sampling number of the detected scrolling events.

17. The method of claim 16, wherein the current scrolling event is determined to be associated with the first scrolling action if an amount of the current scrolling event is not greater than or equal to the CMA multiplied by a scrolling action factor, and wherein the current scrolling event is determined to be associated with the second scrolling action if the amount of the current scrolling event is greater than the CMA multiplied by the scrolling action factor.

18. A non-transitory machine-readable medium encoded with executable instructions for handling scrolling actions for scrolling through content displayed on an electronic device, the instructions comprising code for:
 displaying a current page of the content within a viewport of the electronic device;
 detecting scrolling events sequentially, each of the scrolling events comprising a signal to scroll in an indicated direction and by an indicated amount relative to the content displayed on the electronic device;
 determining, from the detected scrolling events, a first peak scrolling amount of a first scrolling action, the first scrolling action associated with a first plurality of scrolling events;
 determining whether a time between the detection of a current scrolling event of the detected scrolling events and the detection of a previous one of the scrolling events exceeds a predetermined threshold;
 determining whether the current scrolling event is associated with a tail scrolling event of the first scrolling action or a second scrolling action based at least on a scrolling amount of the current scrolling event and the first peak scrolling amount, the first scrolling action preceding the second scrolling action, the second scrolling action associated with a second plurality of scrolling events;
 suppressing the current scrolling event if an edge of a current page of the content is visible within the viewport, the current scrolling event is associated with the tail scrolling event of the first scrolling action, and the time between the detection of the current scrolling event and the detection of the previous scrolling event does not exceed the predetermined threshold to prevent scrolling from the current page of the content to a next page of the content; and
 scrolling from the current page to the next page of the content if the current scrolling event is associated with the second scrolling action or if the time between the detection of the current scrolling event and the detection of the previous scrolling event exceeds the predetermined threshold, and if the edge of the current page is visible within the viewport from the first scrolling action, and if the indicated direction of the second scrolling action is towards the visible edge.

19. The non-transitory machine-readable medium of claim 18, wherein the instructions further comprise code for determining if a direction of the current scrolling event is the same as a direction of the previous scrolling event.

20. The non-transitory machine-readable medium of claim 19, wherein the current scrolling event is determined to be associated with the second scrolling action if the direction of the current scrolling event is not the same as the direction of the previous scrolling event.

* * * * *